(12) United States Patent
Ish et al.

(10) Patent No.: US 8,892,811 B2
(45) Date of Patent: Nov. 18, 2014

(54) REDUCING WRITE AMPLIFICATION IN A FLASH MEMORY

(75) Inventors: Mark Ish, Atlanta, GA (US); Siddhartha K. Panda, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 286 days.

(21) Appl. No.: 13/409,458

(22) Filed: Mar. 1, 2012

(65) Prior Publication Data

US 2013/0232290 A1    Sep. 5, 2013

(51) Int. Cl.
    *G06F 12/00*     (2006.01)
(52) U.S. Cl.
    USPC .................................. 711/103; 711/E12.008
(58) Field of Classification Search
    USPC ........................................ 711/103, E12.008
    See application file for complete search history.

(56) References Cited

U.S. PATENT DOCUMENTS

| | | | |
|---|---|---|---|
| 8,046,551 B1 | 10/2011 | Sahin | 711/162 |
| 2003/0101315 A1* | 5/2003 | Ihde et al. | 711/112 |
| 2010/0023682 A1 | 1/2010 | Lee et al. | 711/103 |
| 2010/0169542 A1 | 7/2010 | Sinclair | 711/103 |
| 2011/0066788 A1 | 3/2011 | Eleftheriou et al. | 711/103 |
| 2011/0066808 A1 | 3/2011 | Flynn et al. | 711/118 |
| 2011/0225346 A1 | 9/2011 | Goss et al. | 711/103 |
| 2013/0074178 A1* | 3/2013 | Sobol et al. | 726/17 |

\* cited by examiner

*Primary Examiner* — Yong Choe (74) *Attorney, Agent, or Firm* — Christopher P. Maiorana, PC (57) ABSTRACT

An apparatus having a memory circuit and a manager is disclosed. The memory circuit generally has (i) one or more Flash memories and (ii) a memory space that spans a plurality of memory addresses. The manager may be configured to (i) receive data items in a random order from one or more applications, (ii) write the data items in an active one of a plurality of regions in a memory circuit and (iii) mark the memory addresses in the active region that store the data items as used. Each data item generally has a respective host address. The applications may be executed in one or more computers. The memory addresses in the active region may be accessed in a sequential order while writing the data items to minimize a write amplification. The random order is generally preserved between the data items while writing in the active region.

20 Claims, 9 Drawing Sheets

REDUCING WRITE AMPLIFICATION IN A FLASH MEMORY

FIELD OF THE INVENTION

The present invention relates to Flash memory generally and, more particularly, to a method and/or apparatus for reducing write amplification in a Flash memory.

BACKGROUND OF THE INVENTION

Conventional NAND Flash memories move data in the background to write over an entire span uniformly. The background data movement is called wear leveling. A process performing the background data movement is often referred to as a garbage collection process. Since Flash memories only write in increments of a page (i.e., 4 kilobytes (KB), 8 KB or 16 KB) and erase data in terms of blocks (i.e., 64 KB up to 512 KB), the background data movement prolongs a useful life and performance of the device. A ratio of a number of writes that happen within the Flash memories per each write received from the user is called a write amplification. Higher numbers for the write amplification results in shorter life spans of the FLASH memories and lower sustained performances.

It would be desirable to implement reduced write amplification in a Flash memory.

SUMMARY OF THE INVENTION

The present invention concerns an apparatus having a memory circuit and a manager. The memory circuit generally has (i) one or more Flash memories and (ii) a memory space that spans a plurality of memory addresses. The manager may be configured to (i) receive data items in a random order from one or more applications, (ii) write the data items in an active one of a plurality of regions in a memory circuit and (iii) mark the memory addresses in the active region that store the data items as used. Each data item generally has a respective host address. The applications may be executed in one or more computers. The memory addresses in the active region may be accessed in a sequential order while writing the data items to minimize a write amplification. The random order is generally preserved between the data items while writing in the active region.

The objects, features and advantages of the present invention include providing a method and/or apparatus for reducing write amplification in a Flash memory that may (i) provide near unity write amplification, (ii) write random data sequentially into the Flash memory, (iii) intermix writing new host data into an active region of the Flash memory with writing copied data from inactive trimmed regions in the Flash memory, (iv) track free/used information on a per-region basis and/or (v) operate with solid-state drives.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Boolean logical NAND-based Flash memories (or devices) may move data around in a background to even out the usage of pages within the Flash memories. The background movement generally extends a limited life of the devices (e.g., limited number of writes each device may support). To even out the usage, Flash memories may re-map a write to either (i) a new unused location or (ii) a lesser used location when the write is received from a server (e.g., a host computer). To create available spaces, movement of some data is designed to create regions and blocks of contiguous space.

A NAND Flash memory may be written in units of pages and erased in units of blocks. One or more blocks may be treated as a large erase block with a range from approximately 1 gigabyte (e.g., GB) up to 16 GB in size. Each erase block may also be divided into multiple regions. A size of each region generally ranges from approximately 512 megabytes (e.g., MB) to 4 GB. For example, an erase block of 4 GB may comprise 8 regions of 512 MB per region. Another erase block of 16 GB may comprise 16 regions of 1 GB per region. Other region sizes and other erase block sizes may be implemented to meet the criteria of a particular application.

To free a previously written region for new writes, all of the pages in all of the regions in the corresponding erase block may be erased to a predetermined logical value (e.g., a logical one value). Since some regions in the erase block may contain valid data, such regions may be copied into another region in a different erase block before erasing the data.

The extra data movement from a current region to a new region may be called a write amplification (e.g., WA). The write amplification basically counts how many writes in the Flash memory are actually performed for each received host write. The write amplification may effect the FLASH devices in two ways, (i) some space may be reserved as over-provisioned space (e.g., never seen by the user applications) and (ii) a total life of the Flash memories may be reduced. Therefore, a write amplification value as close to unity or below may improve the available space and lifetime of the Flash devices. The Flash memories generally have a write amplification of unity if all host write addresses are purely sequential. However, most host applications that use Flash memories in place of magnetic disk drives for improved system performance may request host writes to random addresses. As such, performance is generally improved by converting all random accesses to sequential accesses before committing to the Flash memories.

Some embodiments of the present invention generally strive to make all input/output (e.g., I/O) accesses from one or more user applications sequential. Sequential input/outputs to/from a Flash memory generally have a unity write amplification no matter how much extra space is reserved in the Flash memory for data management.

Figure 1:
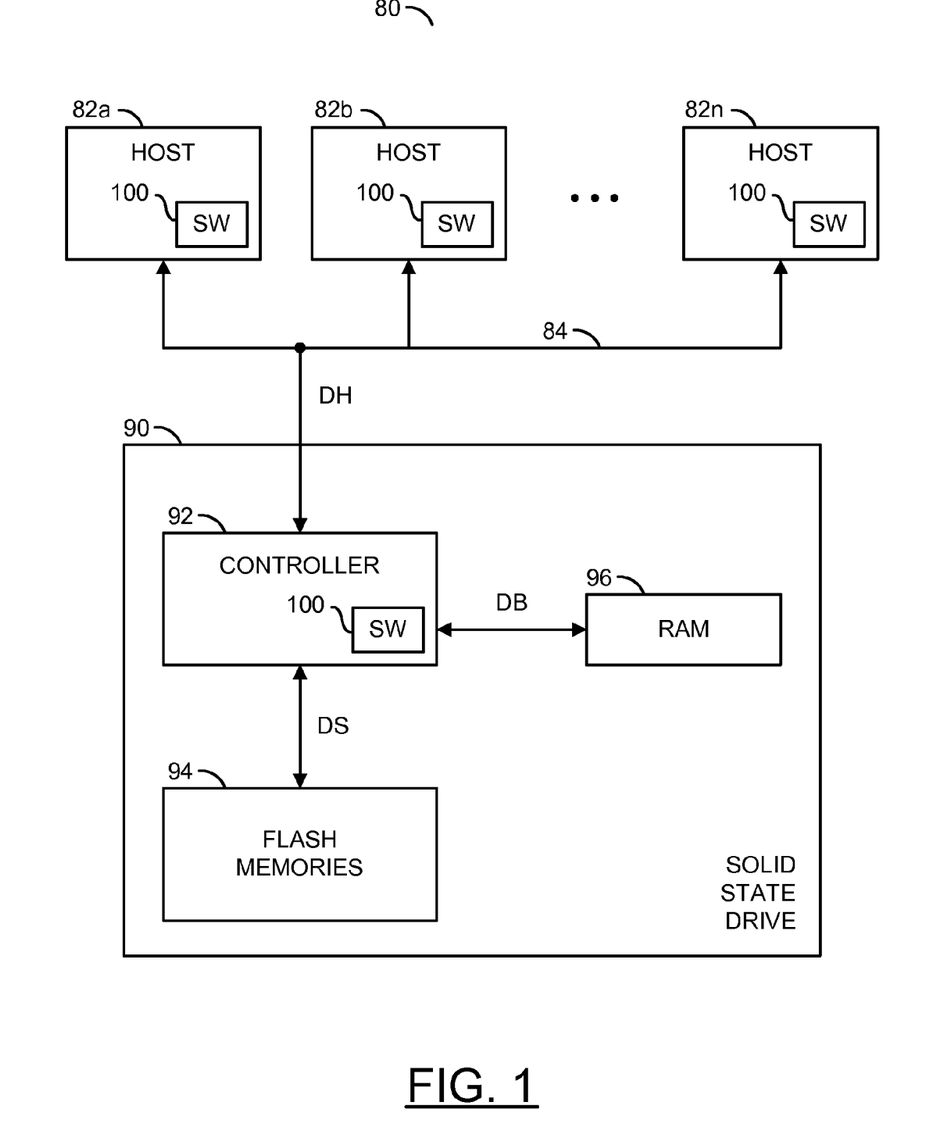
FIG. 1 is a block diagram of an example implementation of a system.

Referring to FIG. 1, a block diagram of an example implementation of a system 80 is shown. The system (or apparatus) 80 generally comprises one or more blocks (or circuits) 82a-82n, a network (or bus) 84 and one or more blocks (or circuit) 90. The circuit 90 may comprise a block (or circuit) 92, a block (or circuit) 94 and a block (or circuit) 96. A block (or module or circuit) 100 may reside in one or more of the circuits 82a-82n and/or the circuit 92. The circuits 82a-100 may represent modules and/or blocks that may be implemented as hardware, software, a combination of hardware and software, or other implementations.

A signal (e.g., DH) may provide bidirectional communication between the circuits 82a-82n and the circuit 92. A signal (e.g., DB) may provide bidirectional communication between the circuit 92 and the circuit 96. A signal (e.g., DS) may provide bidirectional communication between the circuit 92 and the circuit 94.

The circuits 82a-82n may implement host computers (or servers) and/or software applications. Each circuit 82a-82n is generally operational to read and/or write data to and from the circuit 90 via the network 84 in the signal DH. The circuits 82a-82n may also be operational to present requests along with corresponding address information (e.g., host logical block addresses) to the circuit 90 in the signal DH. Furthermore, the circuits may be operational to present commands in the signal DH to the circuit 90. The signal DH may also be controlled by the circuit 90 to convey status information (e.g., cache hit, cache miss, etc.) from the circuit 90 back to the circuits 82a-82n.

The network 84 may implement one or more digital communications network and/or busses. The network 84 is generally operational to provide communications between the circuits 82a-82n and the circuit 90. Implementations of the network 84 may include, but are not limited to, one or more of the Internet, Ethernet, fibre optical networks, wireless networks, wired networks, radio frequency communications networks and/or backplane busses, such as a PCI express bus.

The circuit 90 may implement a solid-state drive circuit. The circuit 90 is generally operational to store data received from the circuits 82a-82n via the signal DH. The circuit 90 may also be operational to present data to the circuits 82a-82n via the signal DH in response to read commands. The circuit 90 may be part of a storage area network (SAN), network attached storage (NAS) and/or disk array subsystem (DAS) architecture. Typical storage capacities of the circuit 90 may range from approximately 1 to 2 terabytes (e.g., TB). Other sizes may be implemented to meet the criteria of a particular application.

The circuit 94 may implement one or more storage volumes. The circuit 94 is generally operational to store data received from the circuit 92 via the signal DS in response to write commands. The circuit 94 may also be operational to present data to the circuit 92 via the signal DS in response to read commands. The storage volumes may be implemented as logical volumes, virtual volumes and/or physical volumes. The circuit 94 generally includes multiple Flash memories. In some embodiments, the Flash memories may be NAND Flash memories.

The circuit 96 may implement one or more buffer circuits. The circuit 96 may be operational to store (or buffer) data, metadata and/or information for use by the circuit 94. A typical storage capacity of the circuit 96 may range from 4 kilobytes (e.g., KB) to 512 KB. In some embodiments, the circuit 96 may be a nonvolatile random access memory (e.g., NVRAM). Other technologies may be implemented to meet the criteria of a particular application.

Part of the circuit 94 storage space visible to the user applications in the circuit 82a-82n may be divided into multiple regions. Each region generally holds respective free/used information. Also, the entire address space of the circuit 94 is generally mapped by a global array of multiple (e.g., 32) bits. An index of the global (or drive) array may be the user application I/O logical block address (e.g., LBA) and a content of the global array may be the physical drive logical block address. The global array generally provides for mapping of the user I/O addresses to the physical addresses of circuit 94. The regions may control the used storage space and the free storage space for the circuit 94.

All I/O requests that come from the circuits 82a-82n may be written sequentially within an active region. The map within the array may be updated with new physical LBA (or memory address) information of where the actual data resides in the circuit 94. If some of the user application I/Os are overwrites, the previous physical LBA of the circuit 94 corresponding to the data being overwritten may be marked as free. The regions may be organized in a queue in a descending order of free space. Therefore, an initial region in the queue generally has the most free space. When more free space is requested, a freest region (e.g., initial region in the queue) may be designated as a target for garbage collection. The garbage collection generally uses large sequential I/O to copy valid data from the target region to an active region. When all of the valid data has been copied to the active region, the entire target region may be marked as free. The sequential copying of regions generally allows for a significant reduction in the write amplification.

Figure 2:
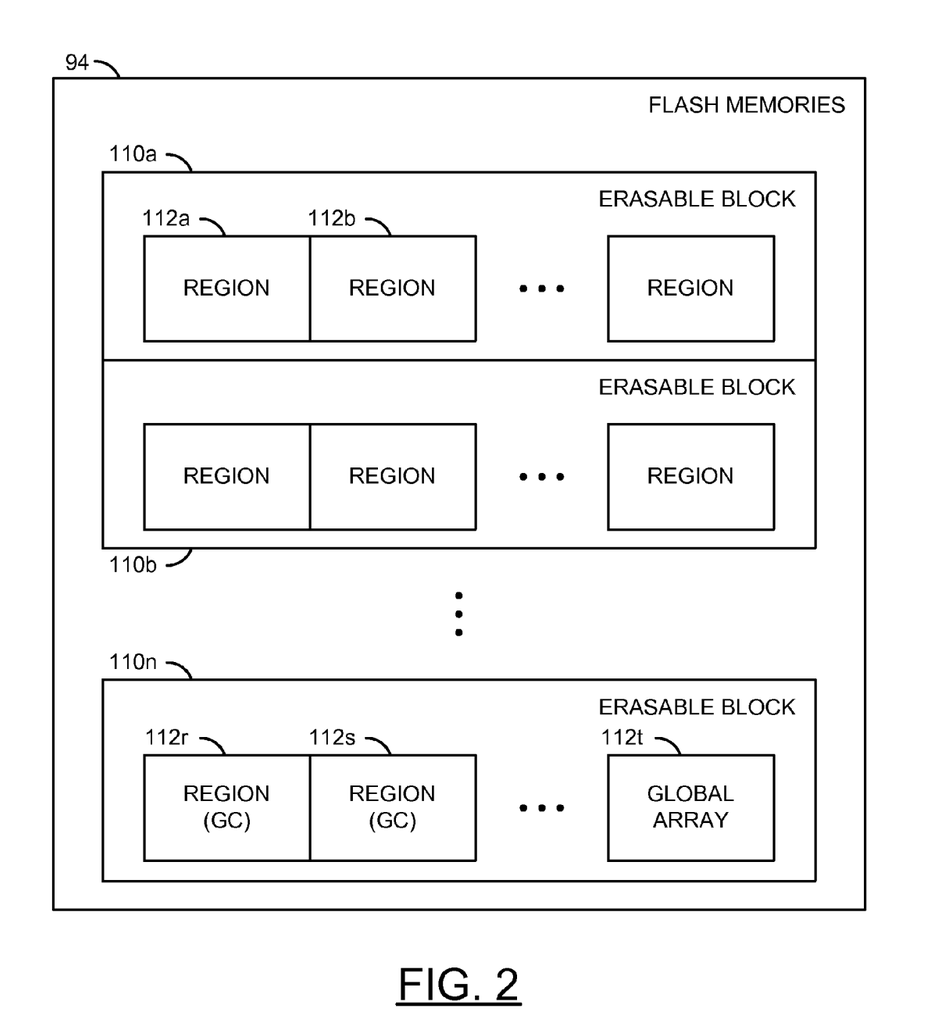
FIG. 2 is a diagram of an example layout of a memory space within a memory circuit.

Referring to FIG. 2, a diagram of an example layout of a memory space within the circuit 94 is shown. The Flash memories within the circuit 94 may comprise multiple blocks (or areas) 110a-110n. Each block 110a-110n generally comprises multiple regions (or areas) 112a-112t.

The blocks 110a-110n may implement erasable blocks of memory. All of the pages within a given block 110a-110n may be erased (e.g., set to the logical one value) in a single erase operation.

Each region 112a-112t may implement a readable/writable page of memory. Each region 112a-112t may be read from/written to a page-at-a-time while unlocked. Reading may be performed at random locations within each region 112a-112t. Writing may be performed at random locations within each region 112a-112t. However, once a page within a region 112a-112t has been written, that page may not be written again until after the region 112a-112t (and the rest of the corresponding blocks 110a-110n) has been erased (or reset).

Figure 3:
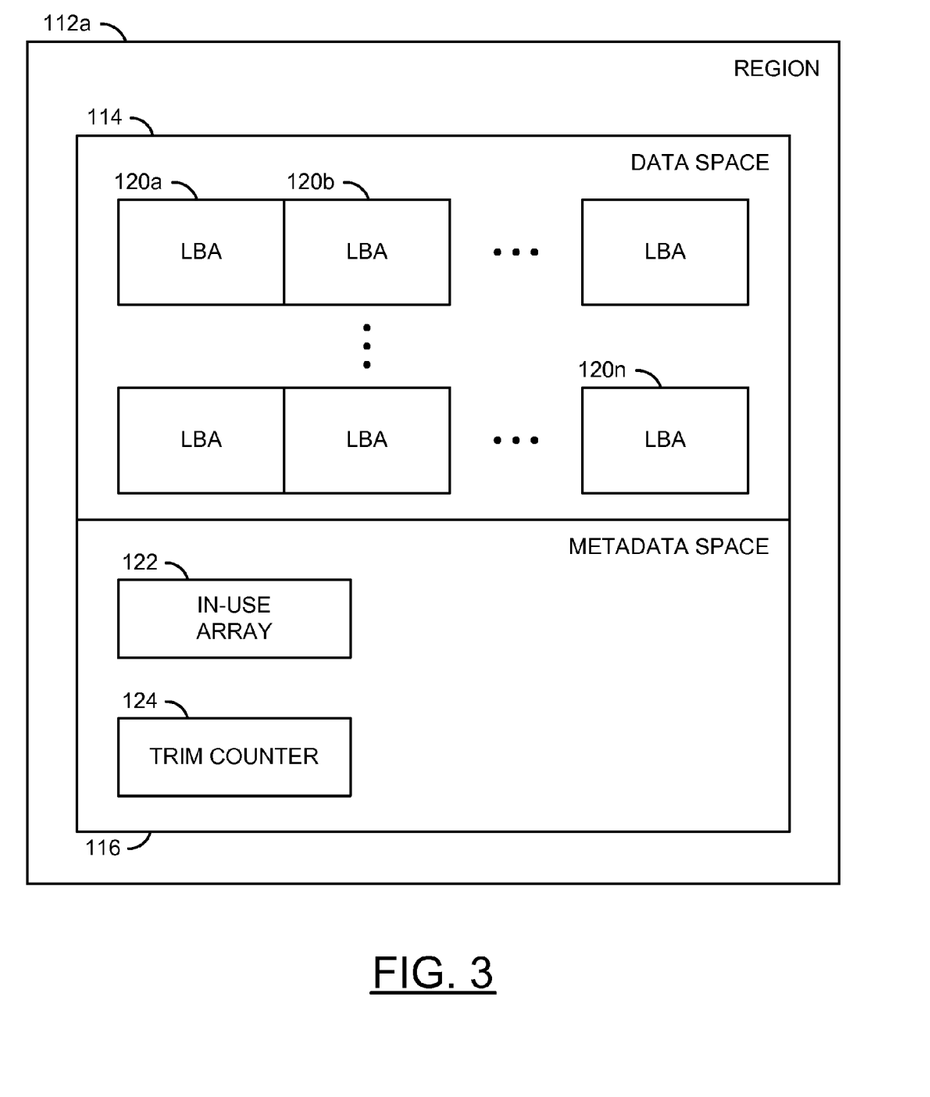
FIG. 3 is a diagram of an example layout of a memory space within a region.

Referring to FIG. 3, a diagram of an example layout of a memory space within the region 112a is shown. The illustration for the region 112a may represent all of the regions 112a-112t. Each region 112a-112t may comprise a block (or space) 114 and a block (or space) 116. The space 114 generally comprises multiple blocks (or addressable units) 120a-120n. The space 116 generally comprises a block (or area) 122 and a block (or area) 124.

The space 114 may implement a data space. The space 114 may be visible to the circuits 82a-82c for reading and writing data. The space 114 generally comprises the blocks 120a-120n.

The space 116 may implement a metadata space. The space 116 may be utilized to store information about the region 112a, the space 114 and the blocks 120a-120n.

The blocks 120a-120n may implement data blocks (or pages). Each block 120a-120n may be uniquely addressed by a corresponding physical device logical block address (or memory address). Individual blocks 120*a*-120*n* may be accessed at random to reach the data stored within. Each block 120*a*-120*n* generally represents data chunks of a unit size (e.g., 16 KB).

Each chunk of data received from/sent to the circuit 82*a*-82*n* may have an associated host (or virtual) logical block address. Each chunk of data written to/read from the circuit 94 may have an associated memory (or physical or physical device) logical block address. The memory addresses may be mapped to the host addresses in the global array. An array index of the global array may be the host addresses. The content stored in the global array may be the memory addresses. The global array generally establishes an in-memory mapping between host to backend volumes in the circuit 94.

The global array is generally stored in the circuit 96 during normal operations. Approximately 400 MB of space in the circuit 96 may be used to map a 1 TB storage space in the circuit 94. As part of a power down routine, the contents of the global array may be copied into a metadata space 116 of a region (e.g., 112*t*) in the circuit 94. As part of a power up routine, the copy of the global array may be moved from the circuit 94 back into the circuit 96. While stored in the circuit 94, the global array mapping information may also be written in same 16K chunk size as the host I/O data. In some embodiments, the circuit 96 may be implemented as a nonvolatile memory. Therefore, copying between the circuit 96 and 94 at power down and power up may be skipped.

The block 122 may implement an in-use block. The block 122 generally contains an array of information (e.g., use/free) for each of the blocks 120*a*-120*n*. When the region 112*a* has been erased, all of the blocks 120*a*-120*n* may be marked as free. When a given block 120*a*-120*n* is written, the corresponding flag (e.g., bit or bits) within the in-use array 122 may be marked as used. When a given block 120*a*-120*n* is either trimmed or the data inside becomes invalid, the corresponding flag within the in-use array 122 may be marked as free.

The block 124 may implement a trim counter. The block 124 generally contains a counter that keeps track of how may flags in the in-use array 122 change from the used state to the free state. The trim counter 124 generally provides the module 100 with an indication of the amount of previously-written-but-now-free space in the associated region 112*a*. The trim count 124 generally does not include the blocks 120*a*-120*n* that have been erased (and thus are free), but not yet written. When a trim count 124 exceeds a threshold value, execution of the garbage collection may be considered.

Some regions 112*a*-112*t* may be reserved for specific operations. For example, one or two of the regions 112*a*-112*t* (e.g., regions 112*r*-112*s*) may be reserved for use in the garbage collection operations. Another region (e.g., 112*t*) may be reserved to store the global array (map) while the circuit 90 is without electrical power. The special regions 112*r*-112*t* may not be visible to the circuits 82*a*-82*n*.

The space of the circuit 94 may be divided into the regions 112*a*-112*t* of similar or the same size. Random host application write requests may be serialized in a particular region 112*a*-112*n*. At any point in time, the writes to the circuit 94 may be performed sequentially in a single current (or active) region 112*a*-112*t*. The writes are generally aligned on the unit size (e.g., 16KB) boundary. Once the current region 112*a*-112*t* is filled, writing may continue with another region 112*a*-112*t* using the sequential write pattern. As the data is written into the blocks 120*a*-120*n*, the map in the global array may be updated.

Each region 112*a*-112*n* may have a size ranging from approximately 512 MB to 4 GB. The region size may be a tunable parameter to account for the different I/O criteria of the various circuits 82*a*-82*n*. For example, if the size of each region 112*a*-112*t* is 1 GB and the unit size of the read/write data is 16 KB, the circuit 92 may perform 64,000 sequential writes into the current active region 112*a*-112*t* before the active region 112*a*-112*t* is filled and a new active region 112*a*-112*t* is designated. Each of the 64,000 sequential writes may be a single write. Therefore, the write amplification may be unity until the data is moved to another region 112*a*-112*t*, if ever.

Figure 4:
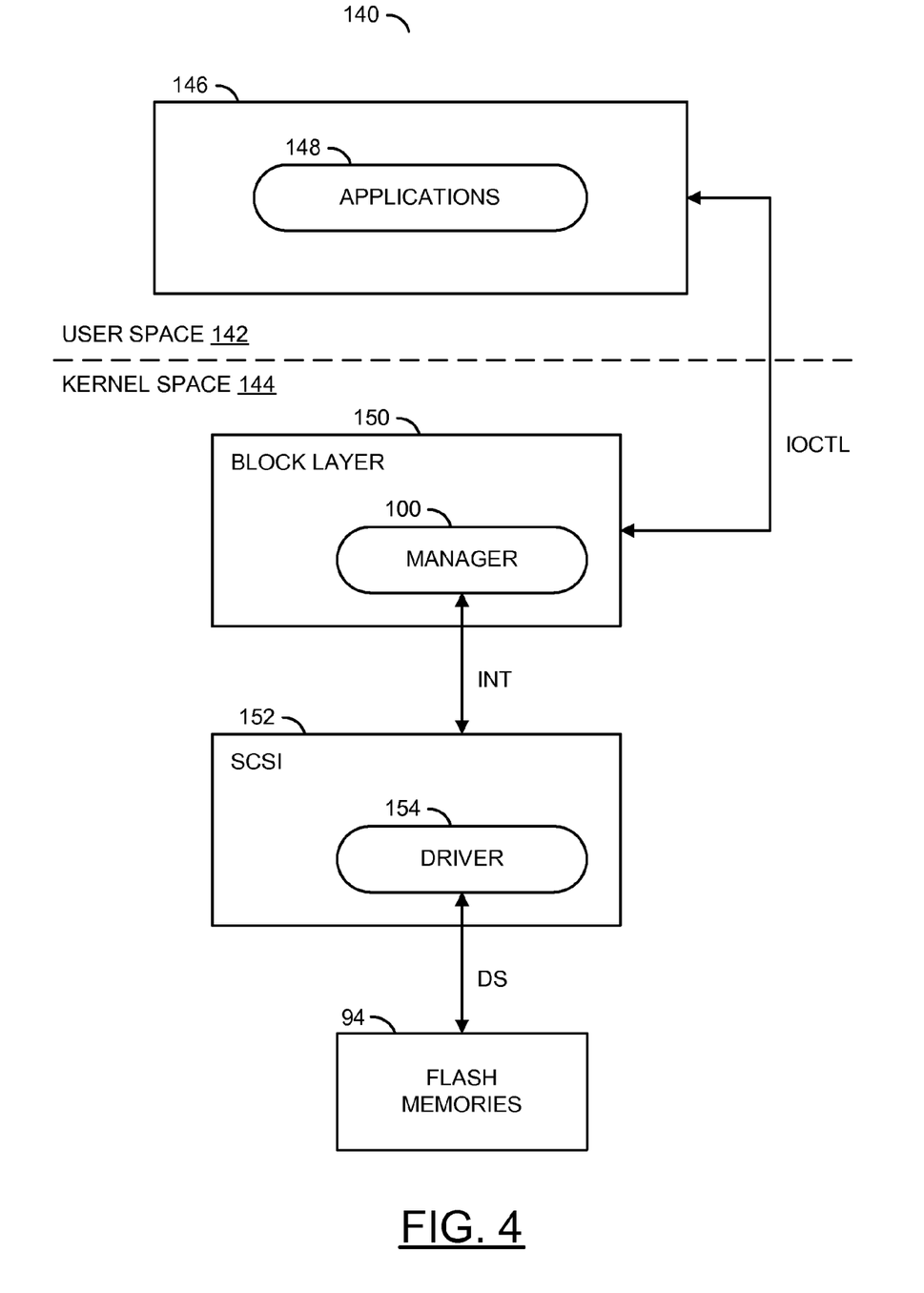
FIG. 4 is a diagram of an example software implementation for performing host accesses to the memory circuit.

Referring to FIG. 4, a diagram of an example software implementation 140 for performing host accesses to the circuit 94 is shown. The software 140 may be parsed into modules in a user space 142 and modules in a kernel space (or stack) 144. The user space 142 generally comprises a module (or block) 146. The module 146 may include a module (or block) 148. The kernel space 144 generally comprises a module (or block) 150 and a module (or block) 152. The module 150 may include the module 100. The module 152 may include a module (or block) 154. Input/output control and the data may be exchanged between the user space 142 and kernel space 144 via a signal (e.g., IOCTL). Control and the data may be exchanged between the module 150 (e.g., the module 100) and the module 152 via an intermediate signal (e.g., TNT). The module 154 (e.g., the module 156) may communicate with the circuit 94 via the signal DS.

The module 146 generally comprises the software executing in the circuits 82*a*-82*n*. The module 148 may implement the applications responsible for the host I/O to and from the circuit 90.

The module 150 generally implements a block layer manager layer between the applications 148 and lower levels of the kernel space 144. The module 150 may include the module 100 that provides the functions used to minimize the write amplification.

The module 152 generally implements a Small Computer System Interface (e.g., SCSI) layer. The module 152 is generally operational to handle the communications between the circuit 94 and the module 150. The module 152 may include the module 154. The module 154 may implement a low level software driver for the circuit 94.

In some embodiments, the module 100 may be implemented as a target filter driver in a device mapper layer of Linux. The diver mapper layer may claim the complete circuit 94 and expose the circuit 94 as a devmapper device. The module 100 may also be aware of a strip size used in the storage volumes created within the circuit 94. The region size may be in the strip size boundary. The Linux block layer I/O scheduler coalescing may be disabled. The disabling generally prevents I/Os from going beyond strip size and fall across direct drive firmware (e.g., DFFs) units. As such, the circuit 94 may send the I/Os directly to DFFs without involving firmware for performance reasons.

The space of the circuit 94 may be divided into the regions 112*a*-112*t* of similar (or equal) size. A start and an end of the regions 112*a*-112*t* may be aligned to the boundaries of the erase blocks 110*a*-110*n*. The regions 112*a*-112*t* may also be aligned to the backend strip size (e.g., 128 KB) and the number of metadata entries.

At any point in time, a signal region 112*a*-112*t* may be designated as the active region. The write data may always be written sequentially in the active region 112*a*-112*t*. When random hosts writes are received in the unit size, the host writes may be serialized and dispatched sequentially in the active region 112a-112t. Once the active region 112a-112t is filled, the writes may jump to a next free (e.g., the next freest) region 112a-112t.

The previously written (inactive) regions 112a-112t may be prepared to accept new data by a background garbage collection thread. The garbage collection thread generally picks a maximum trimmed (e.g., the freest) region 112a-112t and starts copying the data to the active region 112a-112t. The data being copied may be written intermixed with the newly received host write data.

The module 100 may be implemented as multiple (e.g., 4) different modules to implement various parts of the write amplification reduction technique. The different modules may be an I/O manager module, a region manager module, a garbage collection manager module and a metadata manager module. Other configurations may be implemented to meet the criteria of a particular application.

The I/O manager is generally responsible for handling the circuits 82a-82n and the circuit 94 I/Os. The I/O manager may also handle various locking/unlocking for the in-use blocks 120a-120n. The locks account for situations where both the host I/Os and garbage collection I/Os happen simultaneously (overlapping or in parallel) on a particular block 120a-120n. The I/O manager may also manage wait queues and scheduling of the I/Os to an underneath operating system layer. The I/O manager generally handles non-boundary aligned reads and writes. Though most of the read/writes may be 16K aligned, some non-aligned I/Os may be expected.

The host visible area (or space) is generally divided into the unit-sized data chunks. A ratio of the host visible area size to the unit size may establish a maximum number of map entries in the global array. The index of the array may be derived from the host I/O request LBA. For example, the host I/O LBA may be left shifted by a few (e.g., 5) bits to calculate the corresponding index. Each map entry in the global array may be several (e.g., 4) bytes. Each map entry generally indicates actual data present on a backend chunk of the circuit 94. The most significant bit of each map entry may specify how the remaining bits are configured. The remaining bits may be configured as (i) a backend unit chunk number (e.g., the memory LEA) in the circuit 94 or (ii) an index to the in-use array 122.

The in-use array 122 may keep track of the in-use host data. The term "in use" generally means that a unit of particular data is involved in a host read/write or in the garbage collection. If the most significant bit of a map entry is set (e.g., a one value), a corresponding in-use entry may exist in the in-use array 122. The in-use entries may be used to lock the data (e.g., block 120a-120n) and also for maintaining wait queues when garbage collections I/Os are happening on the data. Since the host space (e.g., number of host LBAs) may be large, the in-use array 122 may be allocated a predefined small size. The size of the in-use array 122 may be sufficient to handle the host I/Os and the garbage collection I/Os at any point in time.

A bitmap may be implemented to find the free slots of the in-use array 122. In some embodiments, a two-level tree bitmap may be established, where each leaf of the tree has a fixed size (e.g., 64 bits). The fixed size may be defined such that a single executable instruction may check if the whole leaf is filled with a particular (e.g., logical one) value.

An I/O context structure may be used to keep track of different types of I/Os, such as host I/Os, garbage collection I/Os, metadata I/Os and the like. The I/O context structure may be pre-allocated and kept in the free list. The I/O context structure generally has a sufficient pre-allocated size to service all of the different kinds of I/Os at any point in time. The I/O context structure object generally has a child-parent mechanism to handle the un-aligned reads/writes. If I/O data lies in a single chunk, the I/O data may be treated as a regular aligned chunk. If the I/O data spans across two or more chunks, the I/O data may be split using the I/O context structure. Splitting is usually appropriate as each chunk may be distributed in different chunks in the circuit 94.

Figure 5:
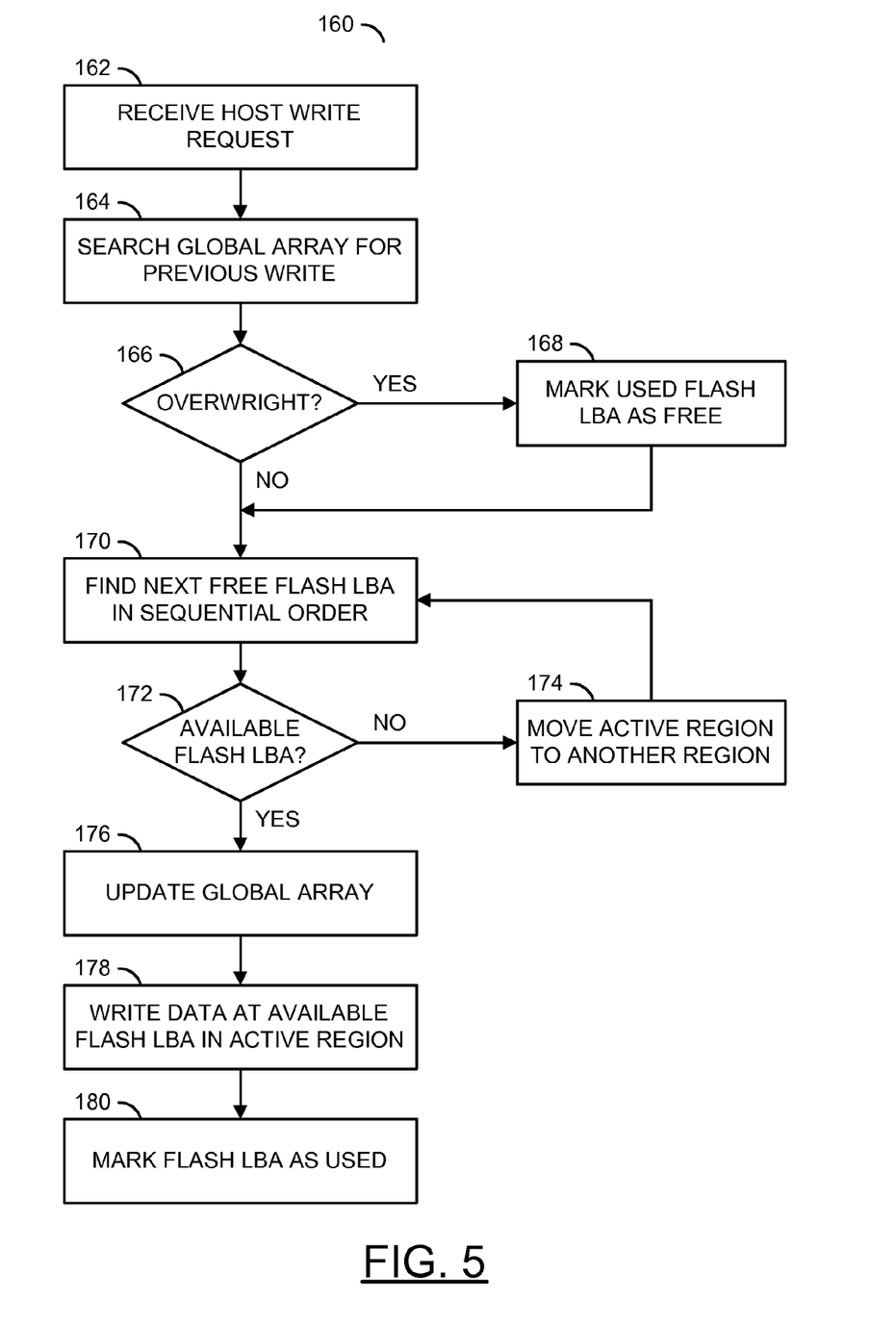
FIG. 5 is a flow diagram of an example implementation of a method for handling a write request in accordance with a preferred embodiment of the present invention.

Referring to FIG. 5, a flow diagram of an example implementation of a method 160 for handling a write request is shown in accordance with a preferred embodiment of the present invention. The method (or process) 160 may be implemented by the module 100 and the circuit 90. The method 160 generally comprises a step (or state) 162, a step (or state) 164, a step (or state) 166, a step (or state) 168, a step (or state) 170, a step (or state) 172, a step (or state) 174, a step (or state) 176, a step (or state) 178 and a step (or state) 180. The steps 162-180 may represent modules and/or blocks that may be implemented as hardware, software, a combination of hardware and software, or other implementations.

In the step 162, a host write request may be received by the module 100. A search of the global array may be performed in the step 164 to determine if the host address of the write request is already mapped to a memory address. If the write request is determined to be an overwrite in the step 166, the memory address of the data being overwritten may be changed from used to free in the step 168. The method 160 may continue with the step 170. If the write request is determined not to be an overwrite in the step 166, the module 100 may find a next free memory address in a sequential order in the step 170. If no free memory address is available in the current active region 112a-112t per the step 172 another region 112a-112t may be declared the new active region 112a-112t in the step 174. A next free memory address in the new active region 112a-112t may be sought in the step 170. Once a free memory address has been found, the global array may be updated in the step 176 to map the free memory address to the host address of the write I/O. The data may be written into the circuit 94 at the free memory address in the step 178. In the step 180, the module 100 may mark the memory address storing the write data as used.

When write data that overwrites an existing block is received inside a single unit boundary, the lock and the in-use block array 122 may normally be updated. However, instead of doing a sequential write into the active region 112a-112t, an overwrite I/O may be directly issued to the existing block in the global array. If the existing block is not written (e.g., not previously trimmed—global array value of 7FFFFFFF), a sequential block may be allocated from the region, the required blocks may be written and the metadata updated like any aligned block.

If the write data spans two or more chunks, similar to the read, multiple I/O context structures may be formed for each spanned chunk. The I/Os may be serviced based on the trim and not-trim valid data.

If the write data fills a whole chuck, the write data may be served as a normal sequential I/O going through the sequential region. If the write data is a fragmented I/O of a chunk, the data may be handled in a similar manner to the write data received inside a single chunk boundary.

Figure 6:
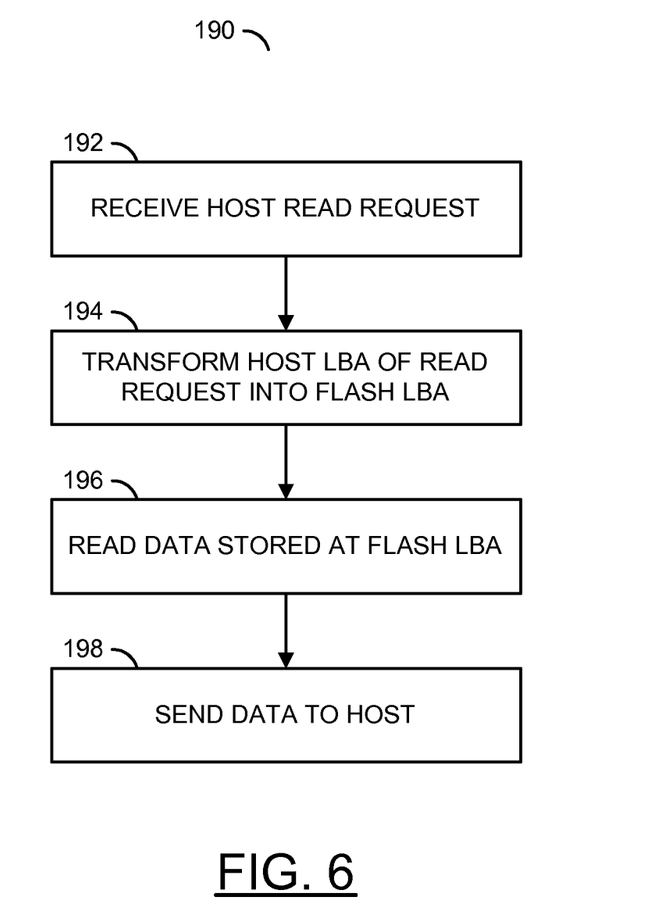
FIG. 6 is a flow diagram of an example implementation of a method for handling a read request.

Referring to FIG. 6, a flow diagram of an example implementation of a method 190 for handling a read request is shown. The method (or process) 190 may be implemented by the module 100 and the circuit 90. The method 190 generally comprises a step (or state) 192, a step (or state) 194, a step (or state) 196 and a step (or state) 198. The steps 192-198 may represent modules and/or blocks that may be implemented as hardware, software, a combination of hardware and software, or other implementations.

In the step 190, a read request may be received by the circuit 90. The host address may be transformed into the memory address in the step 194. The read I/Os may be divided into the unit-sized chunks. For each chunk, a single I/O context structure may exist. Each I/O context structure may lock the corresponding chuck and independently proceed with the read.

In the step 196, the requested data may be read from the circuit 94. In the step 198, the requested data may be transferred to the requesting circuit 82a-82n. After the read, the chunk may be unlocked. During the garbage collection, if multiple I/Os for multiple chunks are to be copied in a short time frame, all of the chunks may be locked together. Otherwise, individual chunks may be locked, copied and then unlocked.

The region manager module is generally responsible for multiple tasks. The tasks may include, but are not limited to, device enumeration, carving out the regions 112a-112t, designating the active region 112a-112t, controlling the number of regions 112a-112t and region sizes, maintaining region trims and trimming the blocks 120a-120n.

During boot up, the region manager may be responsible for device enumeration. The number of host visible regions 112a-112t and the size of each region 112a-112t may be fixed based on performance bench marking. A few of the regions (e.g., 112r-112t) may be reserved. The space of the reserved regions may not be visible to the host circuits 82a-82n. Space in the reserved regions generally helps make the garbage collection efficient. The number of reserved regions may also be flexible so that during bench marking the size may be changed. Furthermore, some space in one or more regions 112a-112b may be designated for the metadata blocks.

During boot up, the region manager may begin operations before the other managers, claim the physical device (e.g., the circuit 94) and carve out the regions 112a-112t. The boot up operations should happen irrespectively of a first-time boot or subsequent boots with valid metadata. The metadata manager may be responsible for populating the global array and the number of trimmed blocks in a region 112a-112t. Furthermore, at an end of metadata manager boot up, only the active region 112a-112t and the current block for IO may be set.

A separate thread for doing the trim may operate in the background. The physical addresses of both host I/Os and garbage collection I/Os may be queued for trimming. A trim caused by an overwrite may be queued only after the write I/O to the new block has completed successfully. A list of Flash block indices to be trimmed may be read. The list may be protected by a separate spinlock.

An application program interface (e.g., API) may take a Flash chunk number (address) as a parameter to be queued on the list in a trim structure. The API may be invoked both in the host I/O and the garbage collection context. For example, a host write may be received by the DM driver. During an I/O done callback, the I/O manager may queue the trim request. For the garbage collection when block movement is initiated from one region to another, the trim function may be called to enqueue a garbage collection (e.g., GC) trim request once the data is moved successfully to the new region. Furthermore, the trim count 124 for the particular region experiencing the trim may be incremented immediately.

The trim thread may wake upon queuing an initial request to the queue. The trim thread may be moved to a sleep state after processing a last request. For multi-core synchronization, after processing the request only the object may be removed from the list. As such, the thread that is queuing the initial request may wake up the trim thread.

Figure 7:
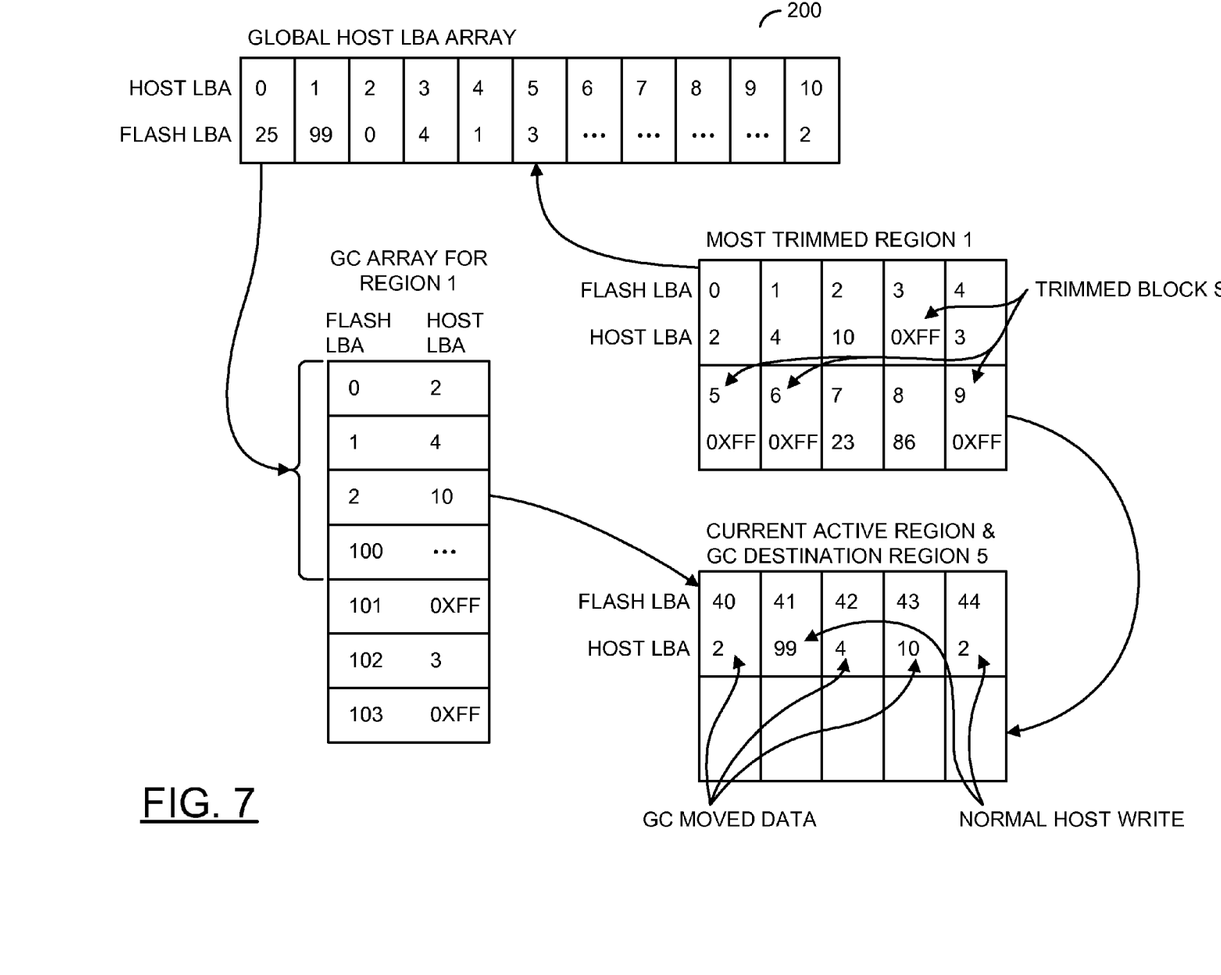
FIG. 7 is a diagram illustrating the information used a garbage collection.

Referring to FIG. 7, a diagram illustrating a garbage collection method 200 is shown. The method (or process) may be implemented by the module 100 and the circuit 90. The garbage collection manager module generally handles a condition where many blocks 120a-120n in the regions 112a-112t are getting trimmed out randomly though the regions 112a-112t were written sequentially. After some time, many scattered trimmed blocks may exist in the different regions 112a-112t. From the global array, the garbage manager may find the locations of data in circuit 94 (e.g., the blocks 120a-120n in a Region 1). If a sufficiently larger number of blocks 120a-120n have been trimmed out, the valid data remaining in the inactive region 112a-112t may be copied to the active region 112a-112t. The garbage collection manager is generally responsible for freeing up a particular region 112a-112t completely. Therefore, subsequent host writes may be served with the cleared region 112a-112t and the write data may be written sequentially within the active region boundary.

Figure 8:
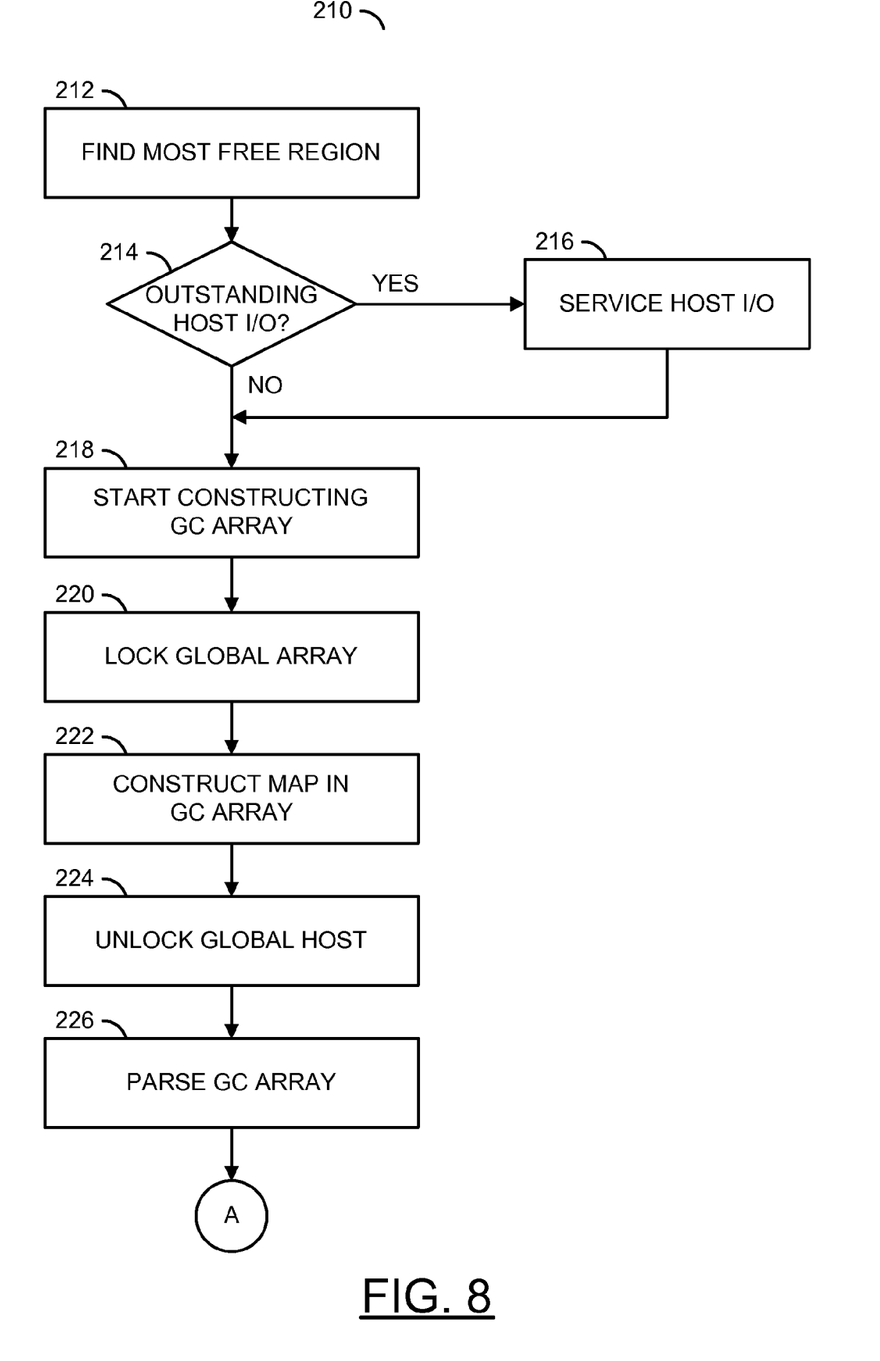
FIG. 8 is a flow diagram of a portion of an example implementation of the garbage collection.
Figure 9:
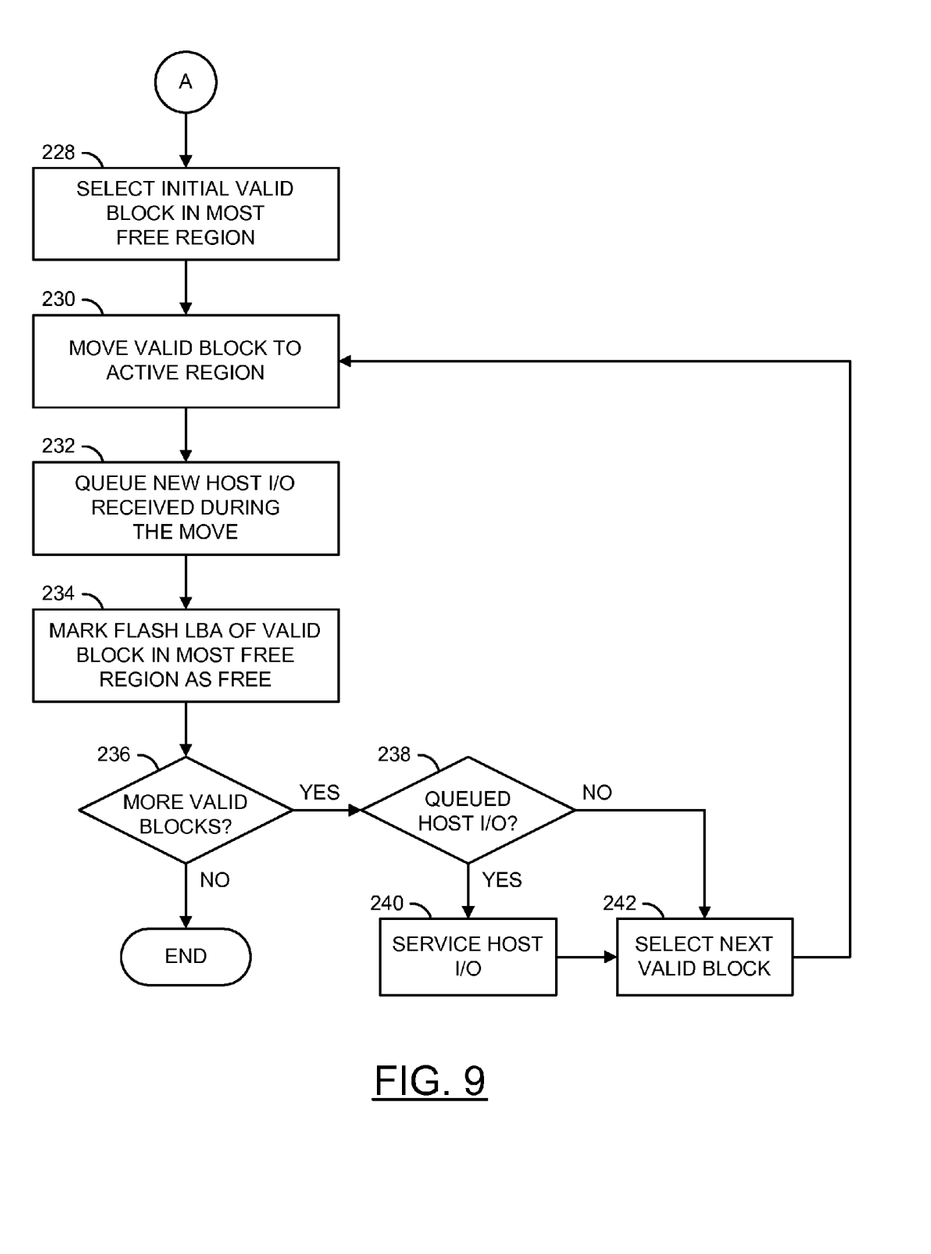
FIG. 9 is a flow diagram of another portion of the garbage collection.

Referring to FIG. 8, a flow diagram of a portion of an example implementation of a garbage collection method 210 is shown. Referring to FIG. 9, a flow diagram of another portion of the method 210 is shown. The method (or process) 210 may be implemented by the module 100 and the circuit 90. The method 210 generally comprises a step (or state) 212, a step (or state) 214, a step (or state) 216, a step (or state) 218, a step (or state) 220, a step (or state) 222, a step (or state) 224, a step (or state) 226, a step (or state) 228, a step (or state) 230, a step (or state) 232, a step (or state) 234, a step (or state) 236, a step (or state) 238, a step (or state) 240 and a step (or state) 242. The steps 212-242 may represent modules and/or blocks that may be implemented as hardware, software, a combination of hardware and software, or other implementations.

The method 210 may be triggered where a predefined number of the regions 112a-112t have been used and have become inactive in terms of host writes. In the step 212, the garbage collection manager may identify a region 112a-112t with the most free (or most trimmed) blocks 120a-120n (e.g., the Region 1 in FIG. 7). In some embodiments, a check may be performed in the step 214 for outstanding host I/O requests. If an outstanding host I/O has been received, the host I/O may be serviced in the step 216. After the outstanding host I/O has been serviced, or if there were no outstanding host I/Os, the method 210 may continue with the step 218. In other embodiments, the host I/Os and the garbage collection I/Os may be serviced in parallel such that the new write data is intermixed (or interlaced) with the garbage collected data.

In the step 218, construction may begin on a garbage collection (e.g., GC) array. The garbage collection manager may lock the global array in the step 220. The GC map may be populated with a portion of the map context from the global array in the step 222. The garbage collection manager may copy multiple (e.g., 100) entries from the global array to the GC array in a single attempt. The number of garbage collection I/Os involved in each attempt may be a tunable parameter so that the host I/Os may be given more or less priority to access the global array. In the step 224, the global array may be unlocked so that other updates may be performed on the global array.

Space for the GC array may be pre-allocated in the circuit 92 or the circuit 96. The GC array may be constructed (or populated) for a particular region that was selected for garbage collection. The GC array may be similar to the global array but used only for a single region. The single region limitation generally exists because only a single region may be involved in the garbage collection at any point in time.

An index of the GC array generally specifies the Flash LBAs for the sequential blocks 120a-120n in the particular region 112a-112t. The content of the GC array may be the host LBAs. The GC array avoids locking the global array during the garbage collection to search for physical block numbers in the region. Therefore, every time a garbage collection starts for a region, a single pass look up through the global array may be performed to construct the garbage collection array.

While constructing the GC array, trims to the region about to be garbage collected may be handled accordingly. Accesses to the global array indices at any point in time may be tracked. Any trim performed before the GC array is completed may be applied to the GC array. Any trims performed after the GC array is completed may be ignored. Therefore, in each host I/O path, if the corresponding memory address lies in the region that is being considered for garbage collection, trimming and overwriting may be checked and verified.

The module 100 may also keep track of the number (or parameter) of data movements that would be done for the region 112a-112t considered for garbage collection. After each movement of the data, the number is generally decremented. The number may also be reduced for host I/Os in case a trim valid block belongs to the garbage collection region 112a-112t. When the number is zero, the region bitmap may be made free and the region may subsequently be used for storing new host I/Os. Therefore, a size of the garbage collection array may be the size of each region in terms of the unit-sized chunks.

The GC array may be parsed in the step 226 to start copying the valid blocks from the inactive region (e.g., Region 1 in FIG. 7) to the active region (e.g., Region 5 in FIG. 7). The valid data movement may happen intermixed with the host I/Os. The metadata for the valid data being moved may be updated in a manner similar for the host I/Os. While performing the garbage collection, the trimmed/overwritten blocks 120a-120n are generally not considered.

The parsing may check the in-use array 122 for the status of each particular block 120a-120n about to be moved. If the in-use bit is already set because a full block host write is in progress, the GC request may be discarded and the GC array may change the host address (e.g., host LBA) corresponding to the particular block to a default value (e.g., OxFF hexadecimal). If the in-use bit is set because either a fragmented write or a read is in progress on the particular block 120a-120n, the GC request may be placed in a wait queue until the fragmented write or read has finished.

Referring to FIG. 9, an initial valid block in the particular (e.g., most free) region 112a-112t may be selected in the step 228. The initial valid block may be copied (or moved) in the step 230 from particular region 112a-112t to the active region 112a-112t. The number of blocks 120a-120n to be moved at any point may be limited to a maximum number. Limiting the number of blocks 120a-120n moved at any point in time generally allow the host I/Os to be served with priority. Any host I/O received while the blocks are being moved by the garbage collection manager may be queued in the step 232.

In the step 234, the Flash address of the valid blocks moved from the particular region 120a-120n may be marked as free. A check may be performed in the step 236 to see if more valid blocks 120a-120n remain to be moved. If valid data blocks remain, a check may be performed to see if any host I/Os exist in the wait queue. If one or more host I/Os reside in the wait queue, the host I/O requests may be serviced in the step 240. If no host I/Os are in the wait queue, or after such queued host I/Os have been serviced, the next block 120a-120n holding valid data may be selected in the step 242. The method 210 may return to the step 230 to move the selected next valid block to the active region. A loop around the steps 230 to 242 may continue until all of the valid blocks 120a-120n have been moved to the active region.

If some contiguous blocks 120a-120n have to be moved to the active region, multiple garbage collection I/Os may be performed, one for each contiguous block. The strip size may also be considered during the move. Basically, each garbage collection I/O should not go across strip boundaries. Otherwise, direct drive I/O of the circuit 94 may be effected.

While picking up a valid block 120a-120n for garbage collection I/O, the in-use array 122 may be locked and subsequent host I/Os may be placed in the wait queue. When the garbage collection data movement is finished, the in-use array 122 may be unlocked and any pending host I/Os in the wait queue may be serviced.

When a garbage collection starts on a particular block 120a-120n, no outstanding host I/Os for that particular block should be present. Any outstanding host I/O present while the GC array was being populated should have trimmed the particular block in the GC array. If an outstanding host I/O writes in the particular block, the garbage collection request corresponding to the particular block may be discarded.

If any pending host I/O reads are present, the garbage collection may still be initiated. In some embodiments, a synchronization may be performed between the GC trim of the particular block and the host I/O read of the same block such that the read occurs before the trim. In other embodiments, all reads may be queued while the garbage collection is happening on the particular block. In still other embodiments, the garbage collection may start after the completion of all outstanding reads.

During the garbage collection operation, the metadata blocks present in the particular region may be trimmed only after finishing all of the data movement. The metadata may remain marked in-use until the move is complete because some data blocks 120a-120n might be waiting for host I/Os to complete when a reboot happens. Keeping valid metadata around until the garbage collection moves are complete generally allows a recovery of the data blocks affected by the reboot.

Details for implement the garbage collection may be as follows. A background kernel thread may be created to process the I/O wait queues. The background kernel thread may be spawned during wd dm driver device configuration. A global singly-linked list (e.g., an in-use list) is generally used to provide information to the quiesced thread about the in-use array index for which wait queue remains to be processed. Two scenarios may exist in the wait queue list processing. While host reads or fragmented (e.g., non-aligned) writes are in progress, a GC request may be put into the wait queue and subsequent host read/writes on the same chunk may be piggybacked on the GC request. In such a scenario, an initial element in the wait queue may be the GC request. When a GC request is queued, all of the subsequent I/O request may be queued after the GC request. The queuing of the subsequent I/O requests generally avoids a starving of the GC request. For a region 120a-120n to complete the garbage collection, all the valid blocks should be moved. If a single GC request starves, the whole region cannot be freed up.

In a host I/O done callback routine, a check may be performed to determine whether the number of read and write pending I/Os in the in-use array 122 is zero. Another check may be performed to see if the wait queue has any requests. If so, an element is generally created in the global singly-linked list and queued for a quiesced thread. A separate spin lock may be provided for the singly-linked list. The lock may be taken when some list objects are queued/dequeued to/from the list. The global spinlock and the lock for the singly-linked list may be synchronized. A quiesced thread may check an ioc node structure. If the I/O type is a GC request, the GC read/write request may be processed, else the normal read/write request may be processed.

While a GC request is in progress, all other host read/write requests may be placed in the wait queue. In a GC I/O done callback routine, a check may be performed to see if there is any pending I/O in the wait queue. If yes, the spinlock for the in-use list may be taken and the index information may be put on the list. Next, the spin lock is generally released and a wait queue thread is woken up. The wait queue thread may take the in-use list spinlock and get the in-use index from the list. The in-use list spinlock may subsequently be released, the global array spinlock may be taken, the node from the in-use array wait queue head may be removed, the ioc node may be obtained from the node element and the request may be processed. A check may be performed on the ioc node structure. If the I/O type is the GC request, the GC read/write request may be processed, else the normal read/write request may be processed. In a GC completion callback context, if a trim counter matches or exceeds a threshold, the corresponding region 112a-112t may be placed in the free pool.

Regarding the metadata manager, for every host write the metadata may be updated for the mapping information. The metadata generally keeps the 4-byte host chunk number for every region 112a-112t. Each block of the metadata data may have the unit size (e.g., 16 KB). Every 16 KB block may accommodate 4196 elements of 4-byte data. Taking out 512 entries for a sequential number, a region number and other fields, a remaining 3684 entries of metadata may be available per block 120a-120n.

Until a particular metadata block is full (e.g., 3684 metadata entries have been made), each 4-byte element may be written in a nonvolatile memory (e.g., the circuit 96). Therefore, when a reboot happens, the last metadata block may be recovered from the nonvolatile memory.

Two intermediate (16K) buffers may be implemented in a memory for metadata updates. At any point in time, one buffer may be active. The other buffer may be involved in flushing to disk or sitting idle waiting for a turn to become active. When a buffer is full (e.g., stores 3684 entries of metadata), the buffer may be designated as passive. The other buffer may be designated as active. Afterwards, a flush of the metadata to the circuit 94 may be initiated. In a similar way, once the active buffer is filled with 3684 metadata entries, the full buffer may be made passive and the data flushed to the circuit 94. As such, the two memory buffers may handle non-stop host I/Os with metadata flush.

The circuit 96 may have a set amount of space (e.g., 16 KB) for temporarily storing the metadata. The space may be memory mapped to the host addressable memory. The circuit 96 may also contain the recent updates of the metadata that might not be updated in the circuit 94. For every 3684 data writes to the circuit 96, only a single metadata block write may be made to the circuit 94.

Some space in the circuit 96 may also be used for handling the host I/Os while a metadata block disk write is happening. When the metadata sync up happens to the circuit 94 from the circuit 96 for a particular region, newly-received host I/Os and garbage collection I/Os may be temporarily buffered. To establish buffers, an extra 500 entries may remain free in every metadata block. Thus, while a metadata block is being written to the circuit 94, up to 500 host writes may be buffered in the other metadata block.

The circuit 96 may be initialized with a predetermined value (e.g., 0xFFFF hexadecimal). The starting several bytes of the circuit 96 may have a pattern that indicates that the circuit 94 was previously configured with the driver. The starting bytes may also store the region size and other information. Furthermore, the starting bytes may determine if the on-disk metadata blocks should be read.

For every metadata block belonging to a particular region, the following information may be written to the circuit 96 before updating the metadata block. The information may be written every time a metadata block is filled with 3684 entries. The information generally includes, but is not limited to, a region number (e.g., 4 bytes), a start block of the region (e.g., 4 bytes) and a sequence number (e.g., 8 bytes) of the metadata block. The sequence number written in the circuit 96 may be the same sequence number written in the circuit 94.

When the maximum number (e.g., 3684) of entries are filled, a predetermined value (e.g., 0xFFFF) may be written in the circuit 96 to indicate an end of the region and a start of another metadata block. After the 0xFFFF value, new metadata block info (e.g., region number, start block, sequence number, etc.) may be written. Following the metadata block into, the metadata entries for the new metadata block are generally written. Therefore, the circuit 96 may be used/updated in a cyclical manner indicating the metadata block start. When a metadata block is flushed, all of the metadata blocks entries in the circuit 96 are generally set to a default value (e.g., 0xFFFFFFFF).

After a reboot or crash, the starting bytes of the circuit 96 may be read. If the starting bytes contain a valid predefine signature, there may be valid metadata blocks present across the circuit 94. The valid metadata blocks may be read one-by-one to gradually populate the in-memory structures.

The metadata blocks may be applied from a lowest sequential number (e.g., oldest) to a latest sequential number. In a single metadata block, the metadata entries may be written one-by-one from top to bottom. Therefore, the initial entries generally have the older data and the entries toward the end have the latest data. Therefore, the metadata entries may be applied in a top down manner in a block. In a region when the first valid metadata block is found, the rest of the metadata blocks in that region generally have the higher sequential numbers because the numbers are top down in any particular region.

During a metadata replay, the regions may be initially stored based on the first valid metadata block sequence number. Once the regions are sorted based on the sequence number, the metadata blocks may be applied region-by-region. In each region the application may be top down. Therefore, the oldest metadata entries may be applied first to construct the in-memory structures.

While applying the metadata from the oldest to the latest, the following steps may be used for constructing the global array and per the region trim count. The entire global array may be initialized with a default value (e.g., 7FFFFFFF) to indicate that the array is trimmed. The per region trim count may also be initialized to a maximum number of the blocks 120a-120n in the regions 112a-112t. While applying the metadata entry, the content of the metadata is generally the host LBA, which should be the host LBA array index. The content may be checked if trimmed. If so, the content may be updated with the corresponding aligned block number of the backend disk. The block number may be found based on the position of the metadata block. As on-disk, the metadata block generally contains the entries for the previous 3684 16

KB blocks. As such, the on-disk block index may be derived. For the region, the trimmed count maintained by region manager may be decremented.

If the global array is already occupied with some previous memory address, the particular memory address may be marked as trimmed. Afterwards, the trim count for that region may be incremented. From any memory address, the region number may be found as the region sizes are the same and laid out in a top down manner. Hence, (i) the whole of the metadata may be applied in increasing order of sequence number and (ii) automatically the host LBA array and trim count of the region may be populated.

At the end of the disk metadata blocks, a metadata block in the circuit 96 may be applied to the global array. The circuit 96 may be fully searched to find the start of the region. A management section of the circuit 96 generally tells about how the start of a metadata block of a particular region is laid out.

From the data stored in the circuit 96, the current active region and the next block to be written may be derived. Furthermore, the two in-memory buffers may be initialized from the data stored in the circuit 96. If the number of trimmed blocks in a region matches the maximum number of blocks, then the complete region is free. Therefore, the region free bitmap is generally initialized accordingly.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory circuit comprising (i) one or more Flash memories and (ii) a memory space that spans a plurality of memory addresses; and
a manager configured to (i) receive a plurality of data items and respective host addresses in a random order from one or more applications, (ii) transform said respective host addresses to said memory addresses, (iii) write said data items in an active one of a plurality of regions in said memory circuit and (iv) mark said memory addresses in said active region that store said data items as used, wherein (a) said applications are executed in one or more computers, (b) said memory addresses in said active region are accessed in a sequential order while writing said data items to minimize a write amplification and (c) said random order is preserved between said data items while writing in said active region.

2. The apparatus according to claim 1, wherein said manager is further configured to (i) read one or more of said data items (a) having valid data and (b) are currently stored in an inactive one of said regions in response to a condition and (ii) write said data items with said valid data in said active region, wherein said writing of said data items read from said inactive region is intermixed with said writing of said data items received from said applications.

3. The apparatus according to claim 2, wherein said condition is true in response to (i) at least a threshold number of said regions having been written to and (ii) said inactive region having a largest number of memory addresses marked as free.

4. The apparatus according to claim 1, wherein said manager is further configured to mark said memory addresses corresponding to said data items stored in an inactive one of said regions as free in response to said data items being copied from said inactive region to said active region.

5. The apparatus according to claim 1, wherein said manager is further configured to mark said memory address corresponding to a given one of said data items stored in said memory circuit as free in response to writing a new one of said data items in said memory circuit where said new data item has a same host address as said given data item.

6. The apparatus according to claim 1, wherein said manager is further configured to mark said memory address corresponding to a given one of said data items stored in said memory circuit as free in response to a trim command received from said applications, wherein said trim command identifies said given data item by said host address.

7. The apparatus according to claim 1, wherein said manager is further configured to (i) receive a read request having a given one of said host addresses from said applications, (ii) transform said given host address into a given one of said memory addresses and (iii) read said data item stored at said given memory address from said memory circuit.

8. The apparatus according to claim 1, wherein (i) a start and an end of each of said regions align to a respective boundary of a plurality of erasable memory blocks of said memory circuit, (ii) each of said erasable memory blocks comprises a plurality of said regions and (iii) said memory circuit implements a solid-state drive.

9. The apparatus according to claim 1, wherein said manager comprises software executed in at least one of (i) said computers and (ii) said memory circuit.

10. The apparatus according to claim 1, wherein said apparatus is implemented as one or more integrated circuits.

11. A method for reducing write amplification in a Flash memory, comprising the steps of:
(A) receiving a plurality of data items and respective host addresses in a random order at a manager from one or more applications executed in one or more computers;
(B) transforming said respective host addresses to said memory addresses;
(C) writing said data items in an active one of a plurality of regions in a memory circuit, wherein (i) said memory circuit comprises (a) one or more of said Flash memories and (b) a memory space that spans a plurality of memory addresses, (ii) said memory addresses in said active region are accessed in a sequential order while writing said data items to minimize said write amplification and (iii) said random order is preserved between said data items while writing in said active region; and
(D) marking said memory addresses in said active region that store said data items as used.

12. The method according to claim 11, further comprising the steps of:
reading one or more of said data items (i) having valid data and (ii) are currently stored in an inactive one of said regions in response to a condition; and
writing said data items with said valid data in said active region, wherein said writing of said data items read from said inactive region is intermixed with said writing of said data items received from said applications.

13. The method according to claim 12, wherein said condition is true in response to (i) at least a threshold number of said regions having been written to and (ii) said inactive region having a largest number of memory addresses marked as free.

14. The method according to claim 11, further comprising the step of:
marking said memory addresses corresponding to said data items stored in an inactive one of said regions as free in response to said data items being copied from said inactive region to said active region.

15. The method according to claim 11, further comprising the step of:
marking said memory address corresponding to a given one of said data items stored in said memory circuit as free in response to writing a new one of said data items in said memory circuit where said new data item has a same host address as said given data item.

16. The method according to claim 11, further comprising the step of:
marking said memory address corresponding to a given one of said data items stored in said memory circuit as free in response to a trim command received by said manager, wherein said trim command identifies said given data item by said host address.

17. The method according to claim 11, further comprising the steps of:
receiving a read request having a given one of said host addresses at said manager from said applications;
transforming said given host address into a given one of said memory addresses; and
reading said data item stored at said given memory address from said memory circuit.

18. The method according to claim 11, wherein (i) a start and an end of each of said regions align to a respective boundary of a plurality of erasable memory blocks of said memory circuit, (ii) each of said erasable memory blocks comprises a plurality of said regions and (iii) said memory circuit implements a solid-state drive.

19. The method according to claim 11, wherein said manager comprises software executed in at least one of (i) said computers and (ii) said memory circuit.

20. A non-transitory computer-readable storage medium containing processor executable instructions configured to perform the steps of claim 11.

* * * * *